Aug. 6, 1957 A. J. SORCHY 2,802,121
FAST-ACTING BRAKE FOR MOTORS AND THE LIKE
Filed Feb. 21, 1956
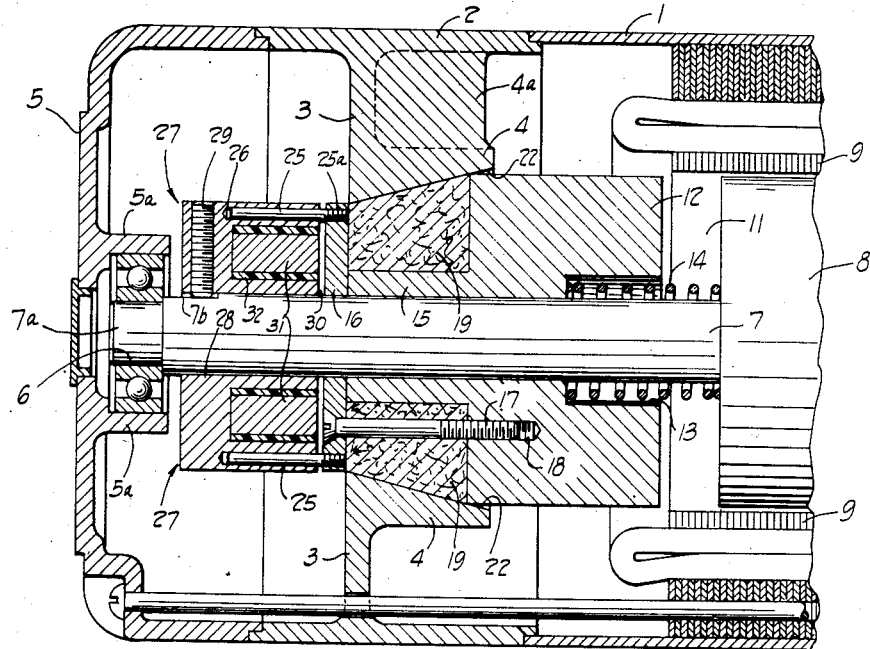
Fig.1
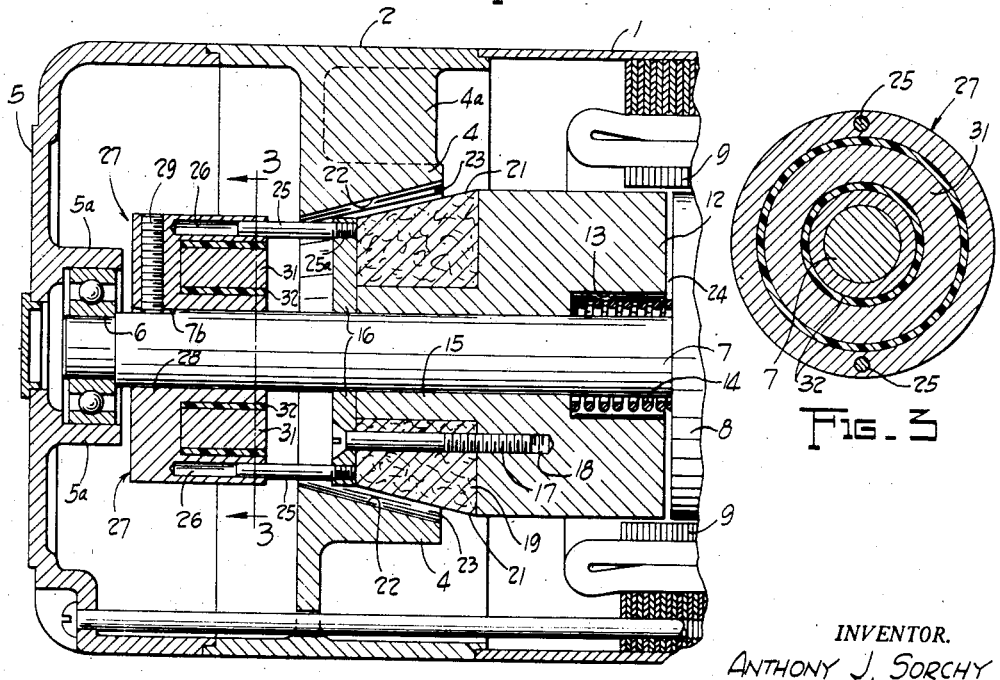
Fig.2
Fig.3
INVENTOR.
ANTHONY J. SORCHY
BY Bosworth, Sessions,
Herrstrom & Lawler
ATTORNEYS

United States Patent Office

2,802,121
Patented Aug. 6, 1957

2,802,121

FAST-ACTING BRAKE FOR MOTORS AND THE LIKE

Anthony J. Sorchy, Cleveland, Ohio, assignor to The Cleveland Electric Motor Company, Cleveland, Ohio, a corporation of Ohio Application February 21, 1956, Serial No. 566,891

19 Claims. (Cl. 310—77)

This invention relates to a fast-acting brake for a dynamo-electric machine such as a motor.

There are many installations that require a motor brake characterized by gradual acceleration and deceleration of the motor, an example being motor-driven trolleys of the types commonly used in mechanical handling systems. For these purposes, motor brakes of the kinds described in my prior applications Serial Nos. 476,793 and 493,720, filed December 21, 1954, and March 11, 1955, respectively, are eminently satisfactory. On the other hand, there are circumstances in which gradual acceleration and deceleration are not particularly well suited to the needs of the installation, as when a trolley incorporating an electric motor must operate on an incline. Also, in electrically-powered hoists operating directly on heavy loads that are to be raised or lowered, gradual acceleration and deceleration are not usually of advantage. Under such circumstances, a fast-acting brake is a desideratum.

The present invention consists in and has for its object the provision of a simple, sturdy brake for a motor or other form of dynamo-electric machine intended to operate under conditions in which rapid acceleration and deceleration of the machine are desirable. To that end, the invention provides a brake with a minimum number of movable parts in which the movable brake element is moved out of brake-set position immediately upon energization of the machine and in which, upon de-energization of the machine, it is moved almost instantly into brake-set position. In the brake constituting the preferred embodiment of the present invention, the movable brake element is held firmly in brake-set position as long as the machine is de-energized. Movement into and out of the brake-set position is prompt, sure and effective, regardless of whether the movement is in brake-setting or in brake-releasing direction.

Other objects, advantages and features of the invention will be apparent from the detailed description which follows and from the accompanying drawings, in which:

Figure 1 is a central vertical section showing the brake with its movable parts in the brake-set position.

Figure 2 is a central vertical section of the brake with its moveable parts in the brake-released position.

Figure 3 is a section through the magnet assembly on line 3—3 of Figure 2.

In Figures 1 and 2, which show the brake of the present invention as applied to an electric motor of the squirrel-cage type, housing 1 encloses the usual stator and rotor. At its left hand end, seen as in Figures 1 and 2, is a housing extension 2 incorporating an integrally formed web 3 that extends normally to the axis of rotation. Web 3 carries a longitudinally extending flange 4 which, at intervals around its periphery, is stiffened by radial ribs 4a. Completing the housing is the usual end bell 5, which is provided with an interiorly extending circular flange 5a for the usual ball bearing assembly 6.

Motor shaft 7 extends through the housing and housing extension into the end bell, where it terminates in the ball bearing assembly. The outboard end of the shaft is reduced as at 7a to accommodate the inner race of the ball bearing assembly. Within housing 1, shaft 7 mounts rotor 8. Surrounding rotor 8 is stator 9, which overhangs the rotor in the manner shown in Figure 1. Thereby is formed a shallow chamber 11, circular in outline, that is adapted to receive the proximate end of a plunger 12 of massive size. Plunger 12 is preferably made of cold rolled steel but may be of any of the metals conventionally used in plungers for solenoids. Its outer diameter is somewhat less than the inner diameter of stator 9, thus permitting it to move into and out of chamber 11 without interfering with the stator. That end of plunger 12 which adjoins rotor 8 is provided with a cylindrical bore 13 for receiving a coil spring 14 which tends to bias plunger 12 into the brake-set position shown in Figure 1. Plunger 12 is slidable on the surface of shaft 7, a clearance of a few thousandths of an inch intervening between them.

At its opposite end, plunger 12 is provided with an integrally formed sleeve 15. Abutting the outboard end of the sleeve is a pole piece 16 taking the form of a shallow annulus having an outer diameter somewhat less than the inner diameter of web 3. Pole piece 16 may be of any suitable material, although cold rolled steel is preferred for the purposes of the invention. It is held to the body portion of plunger 12 by means of screws 17 that are received within tapped openings 18 in the body of plunger 12. Although only one such screw is shown in Figures 1 and 2, there will usually be two or more of them spaced at equal angular distances around the longitudinal axis of the motor. Between pole piece 16 and the body of plunger 12; i. e. radially outward of sleeve 15, is an annular mass 19 of brake lining material. Of conventional composition, it is held in place by means of pole piece 16 and screws 17, which pass through it.

The outer surface of this mass of brake lining material, indicated at 21 in Figure 2, is frusto-conical in shape. A complementary frusto-conical surface 22 tapering at the same angle to the axis of rotation of the motor is formed on the inside face of flange 4. In effect, the frusto-conical surface 22 on flange 4 constitutes the stationary brake element. The movable brake element, the frusto-conical surface 21 on the mass of brake lining material, engages it when the parts are in brake-set position. When the parts are in brake-released position, there is a clearance 23, indicated in Figure 2, between frusto-conical surface 21 and frusto-conical surface 22. In like circumstances, there is a shallow clearance 24 between rotor 8 and plunger 12 which comes about as a result of the presence of a stop (not shown) or as the result of a limit on the compressibility of spring 13.

In order that plunger 12 may turn with shaft 7, two rearwardly extending metal driving pins 25 are threaded into pole piece 16, which is tapped for the purpose, as indicated at 25a. The free ends of pins 25 are received in long, narrow cylindrical bores 26 in a retainer or keeper 27 that is adjustably positioned in relation to the shaft. Specifically, it takes the form of a generally cylindrical magnet assembly affixed to the surface of the shaft.

Magnet assembly 27 consists of an annulus 28 of ferromagnetic material along with various other components, of which the pole piece may be regarded as one. It is held rigidly in place on shaft 7 by means of a threaded set screw 29 the inner end of which bears against a suitable flat 7b in the surface of the shaft. By adjusting set screw 29 in relation to flat 7b, the magnet assembly 27 may be moved axially of shaft 7, thereby increasing or decreasing clearance 30 between the magnet assembly and the proximate end of pole piece 16.

Annulus 28 is not solid but is provided with an annular bore in which is received a ring magnet 31 of a highly magnetic material such as the Indiana Steel Products Company's alloy "Hyflux Alnico V." The latter is understood to be a precipitated hardened alloy of iron, nickel, cobalt, copper and aluminum. Magnet 31 is jacketed along its side walls by a non-magnetic material such as cured epoxide resin. A number of suitable epoxide resins are commercially available in monomeric form from suppliers of synthetic resin chemicals. The resin is supplied in liquid form to the spaces between the side walls of magnet 31 and the adjoining surfaces of annulus 28, caused to cure by means of a liquid catalyst, and allowed to develop in situ into a jacket 32 which at once serves to bond magnet 31 in place and, by what may be called flux insulation, to prevent its magnetic field from reaching the corresponding portions of annulus 28.

After magnet 31 has been assembled in annulus 28 in the manner just described, the entire magnet assembly (not including pins 25) is magnetized by exposure to a strong magnetic field. In consequence thereof, magnet 31 becomes one of the two poles of magnet assembly 27. Annulus 28 becomes the other pole. Thereafter, when magnet assembly 27 is mounted by set screw 29 on shaft 7, it exerts a high degree of magnetic attraction on pole piece 16. When the parts are in the brake-set position illustrated in Figure 1, the magnetic force so produced, abetted by spring 14, serves to hold the movable and stationary brake elements in firm engagement with each other. This state of affairs continues until the motor is energized.

Upon energization of the motor, a powerful electrical field is developed within stator 9. That portion of the stator which overhangs rotor 8 to form chamber 11 exerts a strong attraction for plunger 12 which, as already noted, is slidably mounted on shaft 7. The attractive force is particularly strong at the outset; i. e., during the period when rotor 8 and shaft 7 first begin to turn. As the attractive force develops, it pulls plunger 12, and therefore the movable brake element 19, out of brake-set position, notwithstanding the biasing action of spring 14 and the magnetic forces exerted on pole piece 16 by magnet assembly 27. After the motor is once running under full load, the attractive force diminishes considerably. It nevertheless remains effective insofar as concerns plunger 12, which continues to be attracted by it.

Despite the massive size of plunger 12, the action is prompt, providing virtually immediate release of the brake. So long as the motor is in operation, the force exerted by spring 14 on plunger 12 is not sufficient to urge the plunger into brake-set position in opposition to the attractive force developed by stator 9. This force continues to dominate even though reduced in magnitude during the period when the motor is operating under full load. However, when the motor is deenergized, the attractive force exerted by stator 9 rapidly disappears, whereupon spring 14, no longer subordinated, initiates return movement of the plunger toward brake-set position.

As this movement develops, pole piece 16 at the outboard end of plunger 12 is moved closer to magnet assembly 27. As already noted, the latter is adjustably positioned on shaft 7. Provided it is suitably located on the shaft, its attraction for pole piece 16 soon makes itself felt, resulting in rapidly accelerated movement of the plunger into brake-set position. As a result, the brake-setting action, like the brake-releasing action, is characterized by a very prompt response on the part of the plunger, this notwithstanding the fact that the plunger itself is of massive size and subject to the operation of inertia forces.

Thus the invention provides a brake for a dynamo-electric machine such as a motor which is simple, sturdy and virtually fool-proof. Being easily manufactured, the parts are relatively inexpensive. The cost of assembling them is not excessive. The action of the brake is unusual because of the very rapid response of the plunger to the immediate needs of the situation, whether the movement is from brake-set into brake-released position or vice versa. Because the brake-setting action is so prompt, a motor under full load can be brought to a complete halt in a matter of a very few seconds.

It is evident that modifications may be made without departing from the spirit of the invention by those versed in the art to which the invention relates. At the outboard end of the motor, the magnet assembly may, if desired, be fixed to the end bell or to the housing extension, thus eliminating the need for mounting it on the motor shaft. It may take other forms than that shown in the drawings; for example, it may consist of a plurality of individual magnets spaced from each other at equal angular distances about a common axis. Similarly, the plunger may take different form or, if desired, may be coupled in different fashion to the shaft. Other changes will readily suggest themselves to those skilled in the art.

It is intended that the patent shall cover, by summarization in appended claims, all features of patentable novelty residing in the invention.

What is claimed is:

1. In a dynamo-electric machine, a supporting structure; a shaft mounted for rotation within the supporting structure; a rotor on the shaft; a stator surrounding the rotor, the stator windings overhanging the rotor in such manner as to form a chamber adjacent one end of the rotor; a plunger slidably mounted on the shaft for movement into and out of a retracted position in which the proximate end of the plunger is disposed within the chamber formed by the stator windings; a retainer mounted on the shaft for rotation therewith to which retainer the plunger is coupled at the end thereof remote from the chamber formed by the stator windings; a non-stationary brake element fixedly mounted on the plunger; and, supported from the housing, a stationary brake element engaged by said non-stationary brake element when the plunger is in its non-retracted position.

2. A dynamo-electric machine as in claim 1 in which the plunger is urged away from the rotor by means intervening between the rotor and the plunger.

3. A dynamo-electric machine as in claim 1 in which the plunger is urged away from the rotor by a spring part of which bears on the rotor and part of which bears on the plunger.

4. A dynamo-electric machine as in claim 3 in which, when the plunger is retracted, the spring is compressed within a bore in the plunger.

5. In a dynamo-electric machine, a supporting structure; a shaft mounted for rotation within the supporting structure; a rotor on the shaft; a stator surrounding the rotor, the stator windings overhanging the rotor in such manner as to form a chamber adjacent one end of the rotor; a plunger slidably mounted on the shaft for movement into and out of a retracted position in which the proximate end of the plunger is disposed within the chamber formed by the stator windings; stationary and non-stationary brake elements carried respectively by the supporting structure and by the plunger; and, connected to the end of the plunger remote from the chamber formed by the stator windings, shaft-carried means for communicating the rotation of the shaft to the plunger.

6. A dynamo-electric machine as in claim 5 in which the means for communicating shaft rotation to the plunger take the form of a keeper provided with a slidable connection to the plunger.

7. A dynamo-electric machine as in claim 6 in which the slidable connection consists of a pin and a pin-receiving opening, one associated with the keeper and the other with the plunger.

8. A dynamo-electric machine as in claim 7 in which the pin forms part of the plunger and the opening in which the pin is received is in the keeper.

9. A dynamo-electric machine as in claim 8 in which the plunger is provided with a plurality of axially extending pins and the keeper is provided with a corresponding number of axially extending pin-receiving openings.

10. In a dynamo-electric machine, a supporting structure; a shaft mounted for rotation within the supporting structure; a rotor on the shaft; a stator surrounding the rotor, the stator windings overhanging the rotor in such manner as to form a chamber adjacent one end of the rotor; a plunger slidably mounted on the shaft for movement into and out of a retracted position in which the proximate end of the plunger is disposed within the chamber formed by the stator windings; stationary and non-stationary brake elements carried respectively by the supporting structure and by the plunger; and magnetic means biasing the plunger toward its non-retracted position.

11. A dynamo-electric machine as in claim 10 in which, in addition to the magnetic means, spring means are used to bias the plunger toward its non-retracted position.

12. A dynamo-electric machine as in claim 10 in which the plunger is biased toward its non-retracted position by a spring operating on its inner end and a magnet assembly operating on its outer end.

13. In a dynamo-electric machine, a supporting structure; a shaft mounted for rotation within the supporting structure; a rotor on the shaft; a stator surrounding the rotor, the stator windings overhanging the rotor in such manner as to form a chamber adjacent one end of the rotor; a plunger slidably mounted on the shaft for movement into and out of a retracted position in which the proximate end of the plunger is disposed within the chamber formed by the stator windings; stationary and non-stationary brake elements carried respectively by the supporting structure and by the plunger; and, connected to the end of the plunger remote from the chamber formed by the stator windings, a magnet assembly part of which is separated from the rotor by a distance measuring not less than the combined length and stroke of the plunger.

14. A dynamo-electric machine as in claim 13 in which the magnet assembly comprises one or more magnets disposed in a retainer the central axis of which constitutes an extension of the longitudinal axis of the plunger.

15. A dynamo-electric machine as in claim 13 in which the magnet assembly comprises a ring magnet mounted concentrically of the shaft in alignment with the plunger.

16. A dynamo-electric machine as in claim 13 in which the magnet assembly comprises a ring magnet supported in an annulus of magnetized metal from which it is shielded by a non-magnetic jacket.

17. In a dynamo-electric machine, a supporting structure; a shaft mounted for rotation within the supporting structure; a rotor on the shaft; a stator surrounding the rotor, the stator windings overhanging the rotor in such manner as to form a chamber adjacent one end of the rotor; a plunger slidably mounted on the shaft for movement into and out of a retracted position in which the proximate end of the plunger is disposed within the chamber formed by the stator windings; a non-stationary brake element fixedly mounted on the plunger; a stationary brake element engaged by the non-stationary brake element when the plunger is in its non-retracted position; and means tending to move the plunger into brake-set position, said means including a ring magnet fixedly mounted on the shaft in axial alignment with the plunger.

18. A dynamo-electric machine as in claim 17 in which a non-magnetic jacket encloses the side walls of the magnet.

19. A dynamo-electric machine as in claim 17 in which the magnet is a permanent magnet.

References Cited in the file of this patent

UNITED STATES PATENTS

| 2,480,291 | Gerentes | Aug. 30, 1949 |
| 2,536,491 | Chapman et al. | Jan. 2, 1951 |

FOREIGN PATENTS

| 468,826 | Great Britain | July 13, 1937 |